United States Patent
Williams et al.

(10) Patent No.: US 8,102,976 B1
(45) Date of Patent: Jan. 24, 2012

(54) SYSTEMS AND METHODS FOR TRADING TRACK VIEW

(75) Inventors: Jamie Richard Williams, Fleet (GB);
Damian Grant Smith, Espom (GB);
Marc Calahan, Woodstock, GA (US);
Richard Laurence Heap, Hoboken, NJ (US)

(73) Assignee: Verint Americas, Inc., Roswell, GA (US)

( * ) Notice: Subject to any disclaimer, the term of this patent is extended or adjusted under 35 U.S.C. 154(b) by 790 days.

(21) Appl. No.: 12/181,919

(22) Filed: Jul. 29, 2008

Related U.S. Application Data (60) Provisional application No. 60/952,714, filed on Jul. 30, 2007.

(51) Int. Cl.
*H04M 1/64* (2006.01)
*H04N 7/26* (2006.01)

(52) U.S. Cl. ............ 379/88.17; 345/501; 348/142; 360/15; 370/252; 379/88.22; 380/37; 386/240; 386/241; 386/248; 386/354; 455/406; 709/204; 709/219; 709/231; 711/161; 725/55; 725/116; 725/131

(58) Field of Classification Search .......... 345/501; 360/15; 379/88.17, 88.22; 380/37; 386/241, 386/248, 354, 240; 455/406; 707/104.1; 709/204, 219, 231; 711/161; 725/55, 116, 725/131; 348/142; 370/252
See application file for complete search history.

(56) References Cited

U.S. PATENT DOCUMENTS

| | | | | |
|---|---|---|---|---|
| 6,701,064 | B1 * | 3/2004 | De Haan et al. | 386/248 |
| 6,711,137 | B1 * | 3/2004 | Klassen et al. | 370/252 |
| 6,782,399 | B2 * | 8/2004 | Mosher, Jr. | 1/1 |
| 6,807,023 | B2 * | 10/2004 | Satoh et al. | 360/15 |
| 7,035,619 | B1 * | 4/2006 | Fargano et al. | 455/406 |
| 7,085,377 | B1 * | 8/2006 | Norr | 380/37 |
| 7,286,652 | B1 * | 10/2007 | Azriel et al. | 379/88.22 |
| 7,561,778 | B2 * | 7/2009 | Kim et al. | 386/248 |
| 7,643,727 | B2 * | 1/2010 | Cho et al. | 386/248 |
| 7,647,459 | B2 * | 1/2010 | Zhang et al. | 711/161 |
| 7,720,353 | B1 * | 5/2010 | Jouppi | 386/241 |
| 7,869,700 | B2 * | 1/2011 | MacLean et al. | 386/354 |
| 2003/0221194 | A1 * | 11/2003 | Thiagarajan et al. | 725/55 |
| 2004/0143603 | A1 * | 7/2004 | Kaufmann et al. | 707/104.1 |
| 2004/0153504 | A1 * | 8/2004 | Hutchinson et al. | 709/204 |
| 2004/0264929 | A1 * | 12/2004 | Lee et al. | 386/95 |
| 2004/0268408 | A1 * | 12/2004 | Lee et al. | 725/116 |
| 2007/0024705 | A1 * | 2/2007 | Richter et al. | 348/142 |
| 2008/0147826 | A1 * | 6/2008 | Velusamy et al. | 709/219 |
| 2008/0196078 | A1 * | 8/2008 | Steele et al. | 725/131 |
| 2008/0250153 | A1 * | 10/2008 | Claise et al. | 709/231 |
| 2009/0027401 | A1 * | 1/2009 | Loveridge et al. | 345/501 |
| 2009/0055548 | A1 * | 2/2009 | Williams et al. | 709/231 |

* cited by examiner

*Primary Examiner* — Gerald Gauthier
(74) *Attorney, Agent, or Firm* — McKeon, Meunier Carlin & Curfman, LLC

(57) ABSTRACT

Included are embodiments for providing communications data. At least one embodiment of a method receiving data associated with a communications session, the communications session including a first communications stream and a second communications stream, wherein the first communications stream and the second communications stream are received in a receiving order and recording at least a portion of the communications session. Some embodiments include receiving a request to provide, from the recording, at least a portion of the first communications stream in a visual format and providing at least a portion of the first communications stream in the visual format.

20 Claims, 9 Drawing Sheets

FIG. 9

SYSTEMS AND METHODS FOR TRADING TRACK VIEW

RELATED APPLICATIONS

This application hereby claims the benefit of and priority to U.S. Provisional Patent Application 60/952,714, titled "SYSTEMS AND METHODS FOR TRADING TRACK VIEW", filed on Jul. 30, 2007, and which is hereby incorporated by reference in its entirety.

TECHNICAL FIELD

This application relates to communications and, more specifically, to presentation of data in a communications network.

DESCRIPTION OF RELATED ART

In communications networks, there may be one or more different types of communications devices. More specifically, as some users may utilize a telephone, other users may utilize a computing device, soft phone, and/or other types of communications devices. Similarly, some users may be involved in activities with devices that utilize a plurality of communications streams. As a nonlimiting example, some users may utilize a multi-stream communications device, such as a turret, that is configured for facilitating one or more voice communications, one or more visual communications, one or more intercom communications, and/or one or more data communications.

Additionally, many users desire to playback recorded data from a communications device. As such, presentation of recorded communications data may provide issues with the ability for the user to adequately determine the environment in which the communication took place.

SUMMARY

Included are embodiments for providing communications data. At least one embodiment of a method receiving data associated with a communications session, the communications session including a first communications stream and a second communications stream, wherein the first communications stream and the second communications stream are received in a receiving order and recording at least a portion of the communications session. Some embodiments include receiving a request to provide, from the recording, at least a portion of the first communications stream in a visual format and providing at least a portion of the first communications stream in the visual format.

Also included are embodiments of a system for providing communications data. At least one embodiment includes a first receiving component configured to receive data associated with a communications session, the communications session including a first communications stream and a second communications stream, wherein the first communications stream and the second communications stream are received in a receiving order and a first providing component configured to provide a visual representation of the first communications stream.

Also included are embodiments of a system for providing communications data. At least one embodiment of a system includes first receiving logic configured to receive data associated with a communications session, the communications session including a first communications stream and a second communications stream, wherein the first communications stream and the second communications stream are received in a receiving order and first providing logic configured to provide a visual representation of the first communications stream and the second communications stream in the receiving order.

Other systems, methods, features, and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Embodiments disclosed herein include systems and methods for recording data associated with a multi-stream communications device. Similarly, some embodiments include providing recorded data in a visual display. The recorded data may be associated with a multi-stream communications device. Similarly, the recorded data may be provided at the multi-stream communications device and/or another device.

As a nonlimiting example, a user may be utilizing a turret or other multi-stream communications device. The multi-stream communications device may include a plurality of handsets for facilitating a plurality of separate communications sessions. Additionally, the multi-stream communications device may be configured with an intercom, and/or the ability to facilitate communication of data streams, such as text messages, streaming audio, streaming video, and/or other data. This data may be recorded and stored for later retrieval.

Additionally included herein are embodiments for providing recorded multi-stream communications to a user at a multi-stream communications device, computing device and/or other device. At least one exemplary embodiment may be configured to provide a user interface for presenting the recorded data, as well as a graphical representation of the recorded data. Other embodiments are also included and described in detail below.

Figure 1:
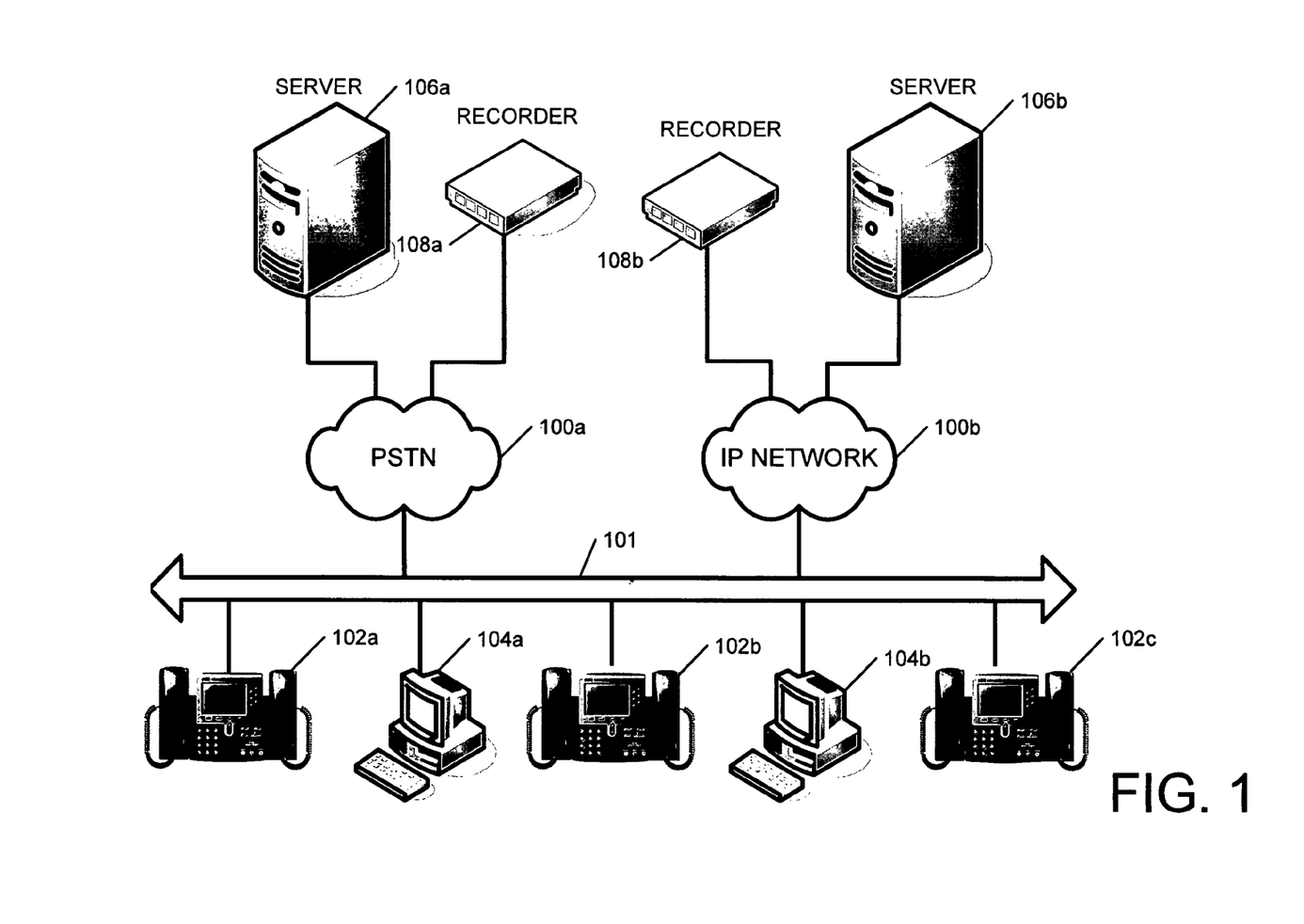
FIG. 1 is a diagram of an exemplary embodiment of a communications network that may be configured for facilitating communications.

More specifically, referring to the drawings, FIG. 1 is a diagram of an exemplary embodiment of a communications network that may be configured for facilitating communications. As illustrated in the nonlimiting example of FIG. 1, a Public Switched Telephone Network (PSTN) 100a and an Internet Protocol (IP) network 104b may be coupled to one or more local networks 101. The one or more local networks 101 may be configured to facilitate communication for multi-stream communications devices 102a, 102b, 102c and/or computing devices 104a, 104b. The PSTN 100a may also be coupled to a server 106a and a recorder 108a. Similarly, the IP network 100b may be coupled to a server 106b and a recorder 108b, one or more of which may be coupled to and/or include a storage device (not shown).

In operation, a multi-stream communications device 102 may engage in a communications session with one or more other parties. The one or more other parties may include other users via a telephonic protocol, IP protocol, and/or other protocol. Similarly, the multi-stream communications device 102 may be configured to send data to and/or receive data from one or more servers 106, recorders 108 and/or other devices. As a nonlimiting example, a server 106 may be configured to providing streaming data (such as stock market activity, and/or other data) to the multi-stream communications device 102a.

Similarly, in at least one exemplary embodiment, the multi-stream communications device 102a may be configured to facilitate an intercom communications session with another communications device 102, computing device 104, and/or other device. In such a configuration, utilization of the PSTN 100a and/or IP network 100b may be unnecessary.

Figure 2:
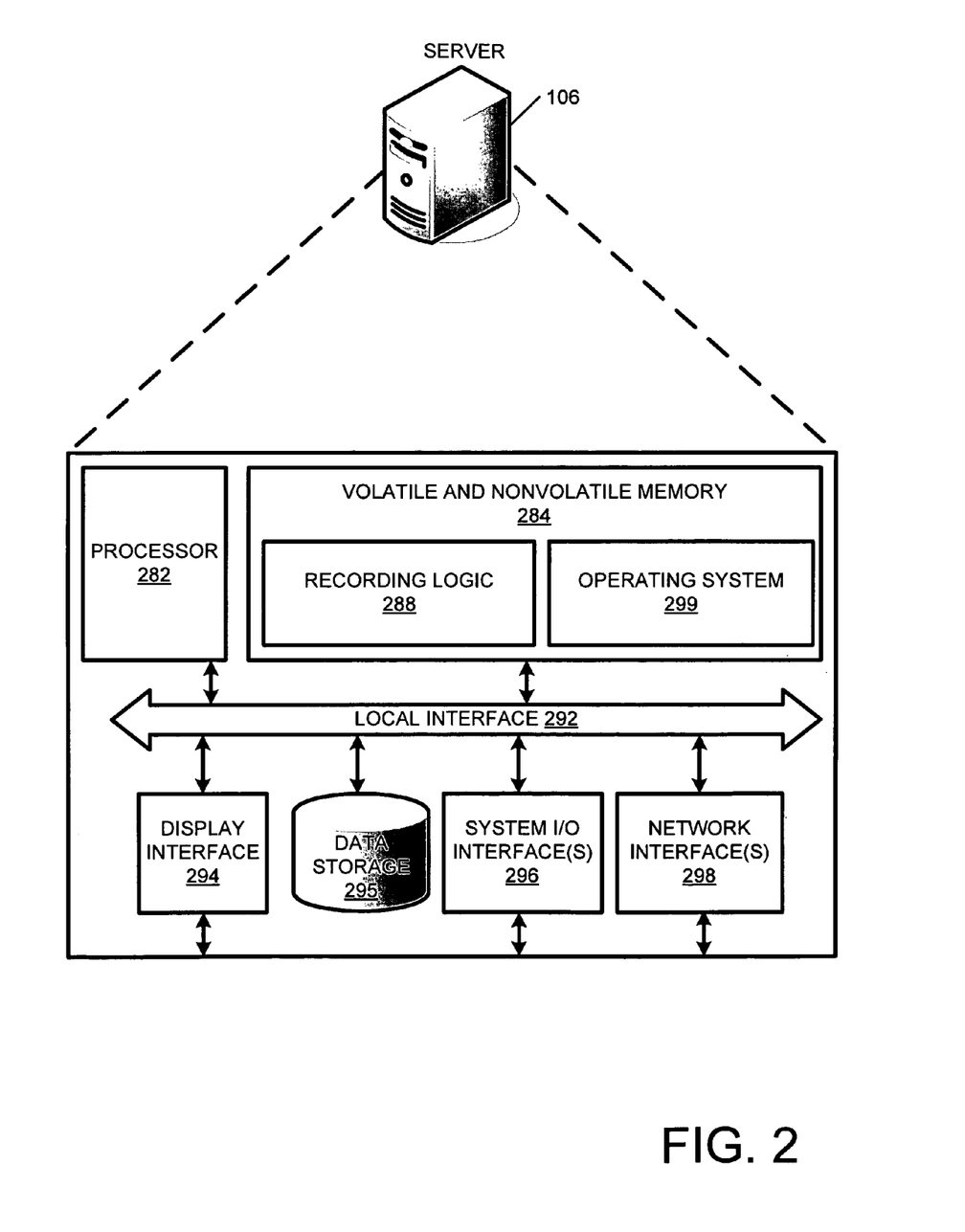
FIG. 2 is a diagram of an exemplary embodiment of a server that may be utilized for facilitating the communications of data.

FIG. 2 is a diagram of an exemplary embodiment of a server 106 that may be utilized for facilitating the communications of data. Although a wire-line server 106 is illustrated, this discussion can be applied to wireless devices, as well. Generally, in terms of hardware architecture, as shown in FIG. 2, the server 106 may include a processor 282, a memory component 284 (which may include volatile and/or nonvolatile memory components), a display interface 294, a data storage component 295, one or more input and/or output (I/O) device interface(s) 296, and/or one or more network interface 298 that are communicatively coupled via a local interface 292. The local interface 292 can include, for example but not limited to, one or more buses or other wired or wireless connections. The local interface 292 may have additional elements, which are omitted for simplicity, such as controllers, buffers (caches), drivers, repeaters, and receivers to enable communications. Further, the local interface 292 may include address, control, and/or data connections to enable appropriate communications among the aforementioned components. The processor 282 may be a device for executing software, particularly software stored in the memory component 284.

The processor 282 can be any custom made or commercially available processor, a central processing unit (CPU), an auxiliary processor among several processors associated with the server 106, a semiconductor based microprocessor (in the form of a microchip or chip set), a macroprocessor, or generally any device for executing software instructions.

The memory component 284 can include any one or combination of volatile memory elements (e.g., random access memory (RAM, such as DRAM, SRAM, SDRAM, etc.)) and/or nonvolatile memory elements (e.g., ROM, hard drive, tape, CDROM, etc.). Moreover, the memory component 284 may incorporate electronic, magnetic, optical, and/or other types of storage media. One should note that some embodiments of the memory component 284 can have a distributed architecture (where various components are situated remotely from one another), but can be accessed by the processor 282.

The software in memory component 284 may include one or more separate programs, each of which includes an ordered listing of executable instructions for implementing logical functions. In the example of FIG. 2, the software in the memory component 284 may include an operating system 299 and recording logic 288. The operating system 299 may be configured to control the execution of other computer programs and provides scheduling, input-output control, file and data management, memory management, and communication control and related services.

A system component and/or module embodied as software may also be construed as a source program, executable program (object code), script, or any other entity comprising a set of instructions to be performed. When constructed as a source program, the program is translated via a compiler, assembler, interpreter, or the like, which may or may not be included within the memory component 284, so as to operate properly in connection with the operating system 299.

The Input/Output devices that may be coupled to system I/O Interface(s) 296 may include input devices, for example but not limited to, a keyboard, mouse, scanner, microphone, etc. Further, the Input/Output devices may also include output devices, for example but not limited to, a printer, display, speaker, etc. Finally, the Input/Output devices may further include devices that communicate both as inputs and outputs, for instance but not limited to, a modulator/demodulator (modem for accessing another device, system, or network), a radio frequency (RF) or other transceiver, a telephonic interface, a media duplication system, a router, etc.

Additionally included are one or more network interfaces 298 for facilitating communication with one or more other devices. More specifically, a network interface 298 may include any component configured to facilitate a connection with another device. While in some embodiments, among others, the server 106 can include a network interface 298 that includes a Personal Computer Memory Card International Association (PCMCIA) card (also abbreviated as "PC card") for receiving a wireless network card, this represents a nonlimiting example. Other configurations can include the communications hardware within the computing device, such that a wireless network card is unnecessary for communicating wirelessly. Similarly, some embodiments include network interfaces 298 for communicating via a wired connection. Such interfaces may be configured with Universal Serial Bus (USB) interfaces, serial ports, and/or other interfaces.

If server 106 includes a personal computer, workstation, or the like, the software in the memory component 284 may further include a basic input output system (BIOS) (omitted for simplicity). The BIOS is a set of software routines that initialize and test hardware at startup, start the operating system 299, and support the transfer of data among the hardware devices. The BIOS is stored in ROM so that the BIOS can be executed when the server 106 is activated.

When server 106 is in operation, the processor 282 may be configured to execute software stored within the memory component 284, to communicate data to and from the memory component 284, and to generally control operations of the server 106 pursuant to the software. Software in memory, in whole or in part, may be read by the processor 282, perhaps buffered within the processor 282, and then executed.

One should note that while the description with respect to FIG. 2 includes a server 106 as a single component, this is a nonlimiting example. More specifically, in at least one embodiment, the server 106 can include a plurality of servers, personal computers, recorders, and/or other devices. Similarly, while the recording logic 288 and the operating system 299 are each illustrated in FIG. 2 as single software components, this is also a nonlimiting example. In at least one embodiment, the recording logic 288 may include one or more components, embodied in software, hardware, and/or firmware. Similarly, the operating system 299 may include one or more logical components. Additionally, while the recording logic 288 and the operating system 299 are depicted as residing on a single computing device, such as the server 106 may be embodied as one or more devices, the recording logic 288 may include one or more components residing on one or more different devices.

Similarly, while the discussion with regard to FIG. 2 refers to a server 106, the above description may be applied to other components discussed herein. More specifically, the computing device 104, the multi-stream communications device 102, the recorder 108, and/or other components may include similar elements and/or operate similarly.

Figure 3:
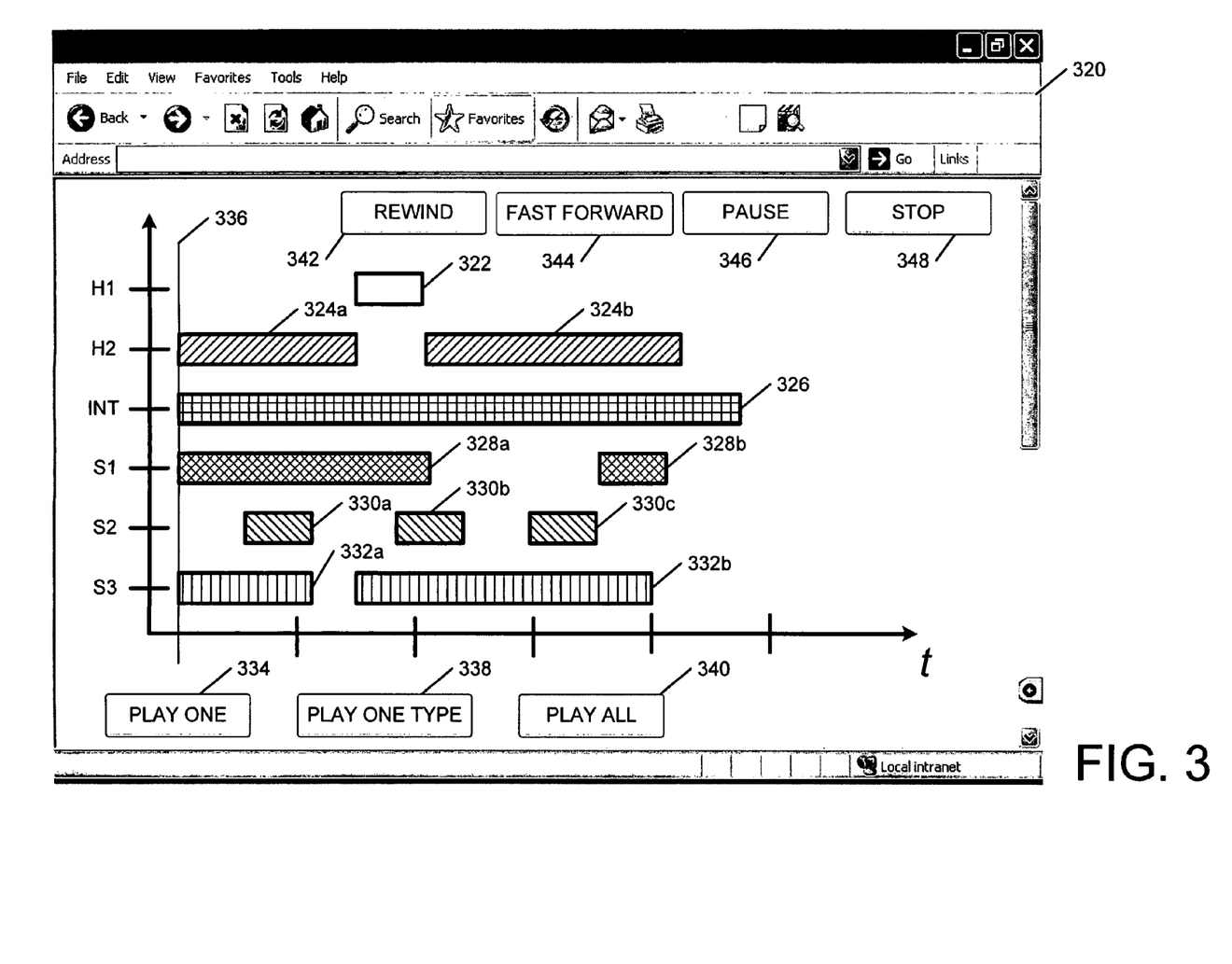
FIG. 3 is a diagram of an exemplary embodiment of a user interface that may be utilized for viewing recorded data.

FIG. 3 is a diagram of an exemplary embodiment of a user interface 320 that may be utilized for viewing recorded data. More specifically, as illustrated in FIG. 3, the user interface 320 may be configured to provide information related to a multi-stream communications device 102. While in at least one exemplary embodiment this information may be provided via a web interface at a computing device 104 that is coupled to the Internet, this is not a requirement. More specifically, in at least one embodiment, this data may be provided at the multi-stream communications device 102 and/or at other devices.

Regardless, the interface 320 may be configured to provide data for one or more streams associated with the multi-stream communications device 102. As shown, the interface 320 can include data for a plurality streams including handset 1 (H1) 322, handset 2 (H2) 324, intercom (INT) 326, data stream 1 (S1) 328, data stream 2 (S2) 330, and data stream 3 (S3) 332. Additionally, the data provided by interface 320 may be displayed according to a chronological display. That is, the data is displayed relative to a time line t.

As also illustrated, the plurality of streams may be received and/or recorded according to a receiving order. More specifically, as illustrated, handset 2 data 324*a*, intercom data 326, data stream 1 data 328*a*, and data stream 3 data 332 may begin at the start of the communications session. Handset 1 data 322, handset 2 data 324*b*, data stream 1 data 328*b*, data stream 2 data 330*b*, 330*c*, and data stream 3 data 332*b* begin and end according to the receiving order. As such, the recorder 108, multi-stream communications device 102, and/or other device may recognize the receiving order for reconstructing the communication during playback.

As is also illustrated, one or more different colors, patterns, and/or shadings may be utilized to differentiate communications streams and/or communications stream types. Similarly, in some exemplary embodiments, other differentiating characteristics may be utilized.

Additionally included are a play one option 334, a play one type option 338, and a play all option 340, as well as a rewind option 342, a fast forward option 344, a pause option 346, and a stop option 348. By selecting the play one option 334, the user can select a single stream to play. That is, information corresponding to the recorded communications stream is played back to the user. Similarly, the user can select a desired portion of a communications stream to view. The communications stream may be provided as audio, video, image, and/or by one or more other presentation techniques.

Similarly, by selecting the play one type option 338, the user can be presented with one or more communications streams of a certain type. As a nonlimiting example, a user can select the play one type option 338 and select one or more of the handset communications streams 322, 324. The user can then be presented with the one or more handset communications streams 322, 324, as they were originally received in the receiving order.

As a nonlimiting example, referring again to FIG. 3, upon selecting the play one type option 338 and indicating that handset streams are to be played, the handset 2 (H2) communications streams 324 received at the handsets may presented. As illustrated, the handset communications stream 324*a* is first received and is presented first for playback. Immediately after handset 2 communications stream 324*a* is completed, handset 1 communications stream 322 is received. As such, this data is then presented for playback. Additionally, upon completion of communications stream 322, handset 2 begins receiving communications stream 324*b*. As such, communications stream 324*b* is presented for playback.

By selecting the play all option 340, the user may be presented with all of the communications streams 322-332, as they were originally received in the receiving order. A cursor 336 may be utilized to illustrate the communications streams that are active at a point during the replay. Upon selecting the play all option 340, all of the communications streams associated with the multi-stream communications device 102 may begin replay in the receiving order (e.g., in FIG. 3 beginning with H2, INT, S1, and S3). The cursor 336 may advance to the right (in this nonlimiting example) as playback advances. The user can "drag" the cursor 336 to a desired portion of the playback and/or otherwise select a desired portion for playback.

Figure 4:
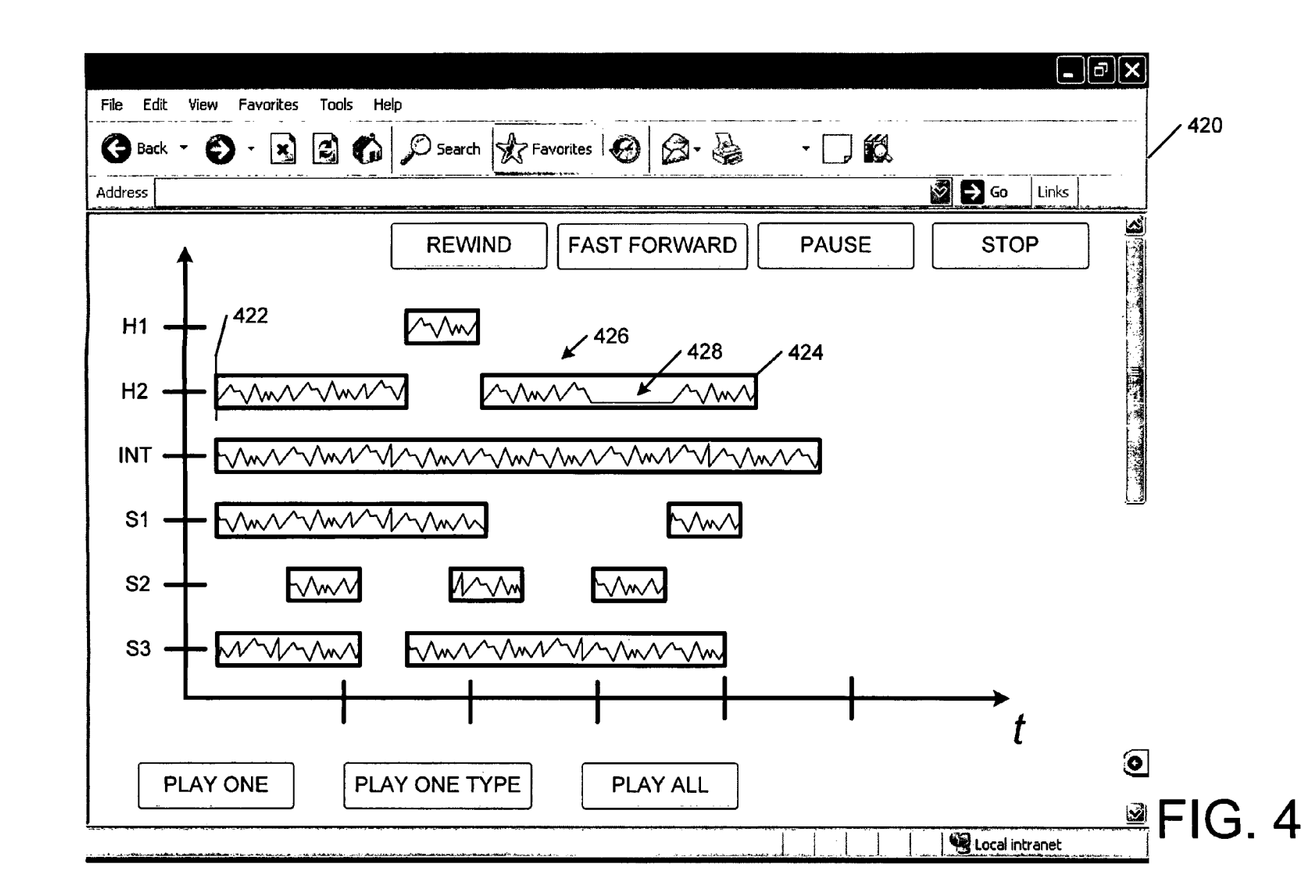
FIG. 4 is a diagram of an exemplary embodiment of a user interface that may be utilized for determining active portions of recorded data.

FIG. 4 is a diagram of an exemplary embodiment of a user interface 420 that may be utilized for determining active portions of recorded data. As illustrated in the nonlimiting example of FIG. 4, the user interface 420 may be configured to provide one or more communications streams associated with a multi-stream communications device 102. More specifically, in this nonlimiting example, the communications stream 424 may be provided with an illustration 426 of the activity within a communications stream 424. As is also displayed, a period of inactivity is illustrated at portion 428. With this information, the user can determine that the period of inactivity may not be beneficial and may skip to a period of greater communicative activity.

Figure 5:
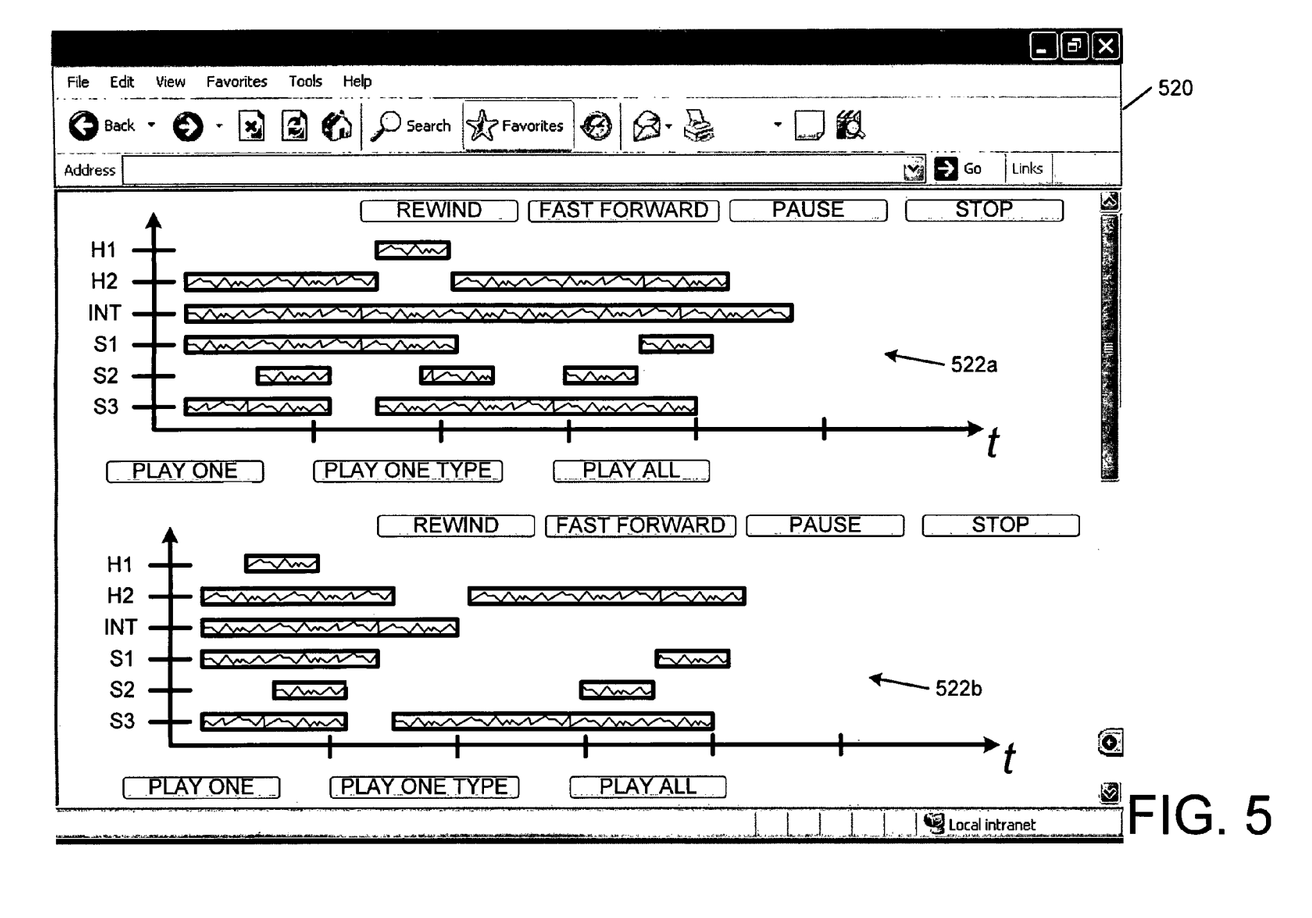
FIG. 5 is a diagram of an exemplary embodiment of a user interface that may be utilized for providing a plurality of recorded communications sessions.

FIG. 5 is an exemplary embodiment of a user interface 520 that may be utilized for providing a plurality of recorded communications sessions. As illustrated in the nonlimiting example of FIG. 5, the user interface 520 may be configured to provide communications streams associated with a plurality of communications sessions. More specifically, display 522*a* may be configured to provide data for a first communications session, while display 522*b* may be configured to provide data for a second communications session.

One should note that, with regard to FIGS. 3-5, depending on the particular configuration, each communications stream may be provided via a different output device. More specifically, in at least one exemplary embodiment, a first speaker may be configured to provide data associated with handset 1 (H1), a second speaker may be configured to provide data associated with handset 2 (H2), etc. One should also note that, while handset data may be received as audio data, this is a nonlimiting example. More specifically, in at least one embodiment, handset data may be received as audio data, video data, image data, text data, and/or other types of data. Similarly, in at least one exemplary embodiment, received communications streams may be converted to a desired format for playback. As a nonlimiting example, audio data may be converted to text, text may be converted to audio, etc.

Similarly, in at least one exemplary embodiment, one or more of the communications streams may be provided via the same output device. As a nonlimiting example, data associated with handset 1 (H1) and data associated with handset 2 (H2) may be provided by the same set of speakers in the receiving order. Similarly, other communications streams may be provided via the speakers. Additionally, while these embodiments may be set by the user interface, at least one embodiment may be configured such that a user can determine the one or more output devices utilized for one or more of the communications streams, and/or which output device is configured to output one or more of the communications streams.

Figure 6:
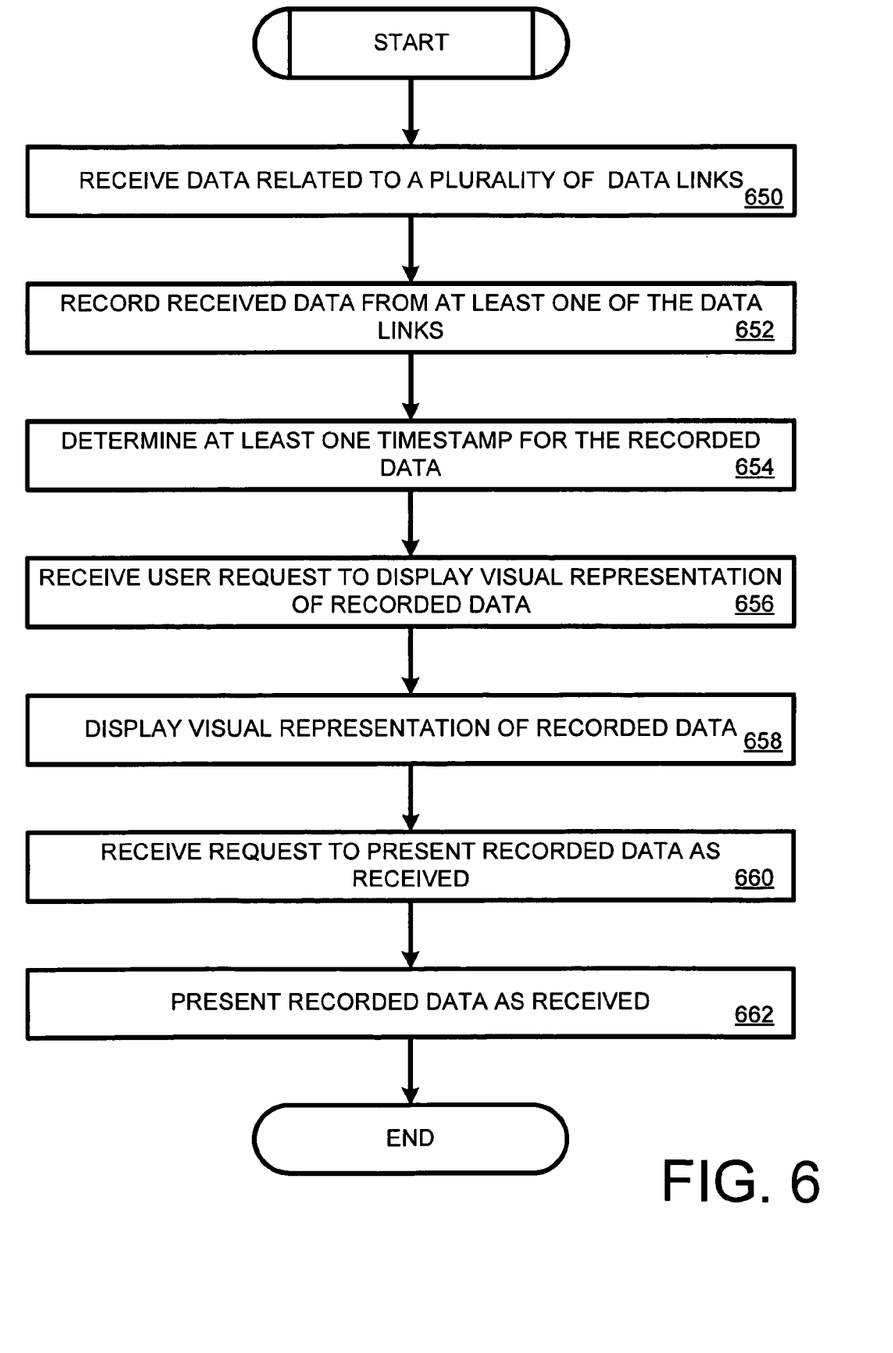
FIG. 6 is a diagram of an exemplary embodiment of a process that may be utilized for providing recorded data.

FIG. 6 is a diagram of an exemplary embodiment of a process that may be utilized for providing recorded data. As illustrated in the nonlimiting example of FIG. 6, a communications device can receive data related to a plurality of data links (block 650). The communications device can record the received data from at least one of the data links (block 652). The communications device can evaluate at least one timestamp for the recorded data for determining the receiving order (block 654). More specifically, depending on the particular configuration, the data may be stored as a plurality of data files. In such a configuration, timestamp data may be utilized to determine times to begin and/or end playback of a particular communications stream.

The communications device can then receive a user request to display a visual representation of the recorded data (block 656). The communications device can display a visual representation of the recorded data (block 658). The communications device can receive a request to present recorded data as received (block 660). This may be via a selection of the play one type option (e.g., option 338 from FIG. 3) and/or selection of the play all option (e.g., option 340 from FIG. 3). The communications device can then present the recorded data as received in the receiving order (block 662).

Figure 7:
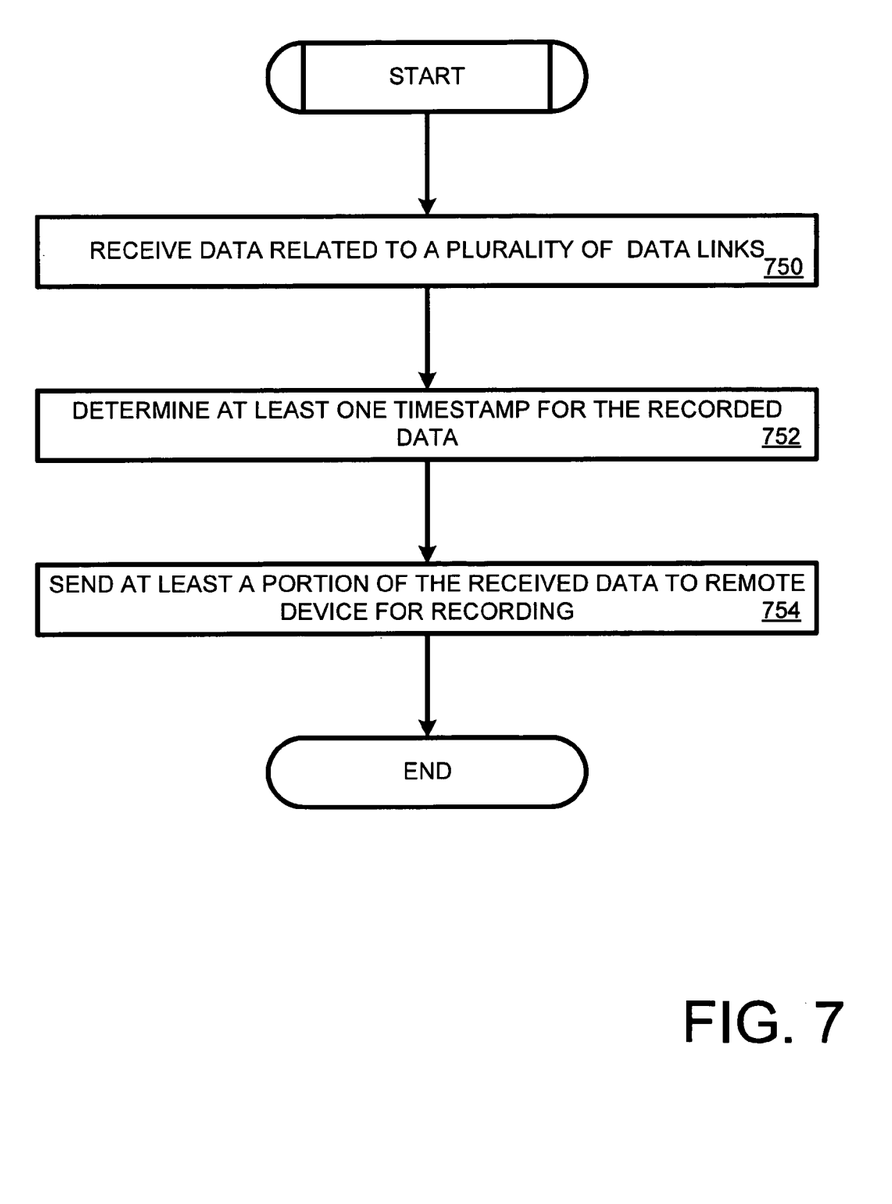
FIG. 7 is a diagram of an exemplary embodiment of a process that may be utilized for sending data to a remote device.

FIG. 7 is an exemplary embodiment of a process that may be utilized for sending data to a remote device. As illustrated in the nonlimiting example of FIG. 7, a communications device can receive data related to a plurality of data links (block 750). The communications device can evaluate at least one timestamp for the recorded data (block 752). The communications device can send at least a portion of the received data to a remote device for recording (block 754).

Figure 8:
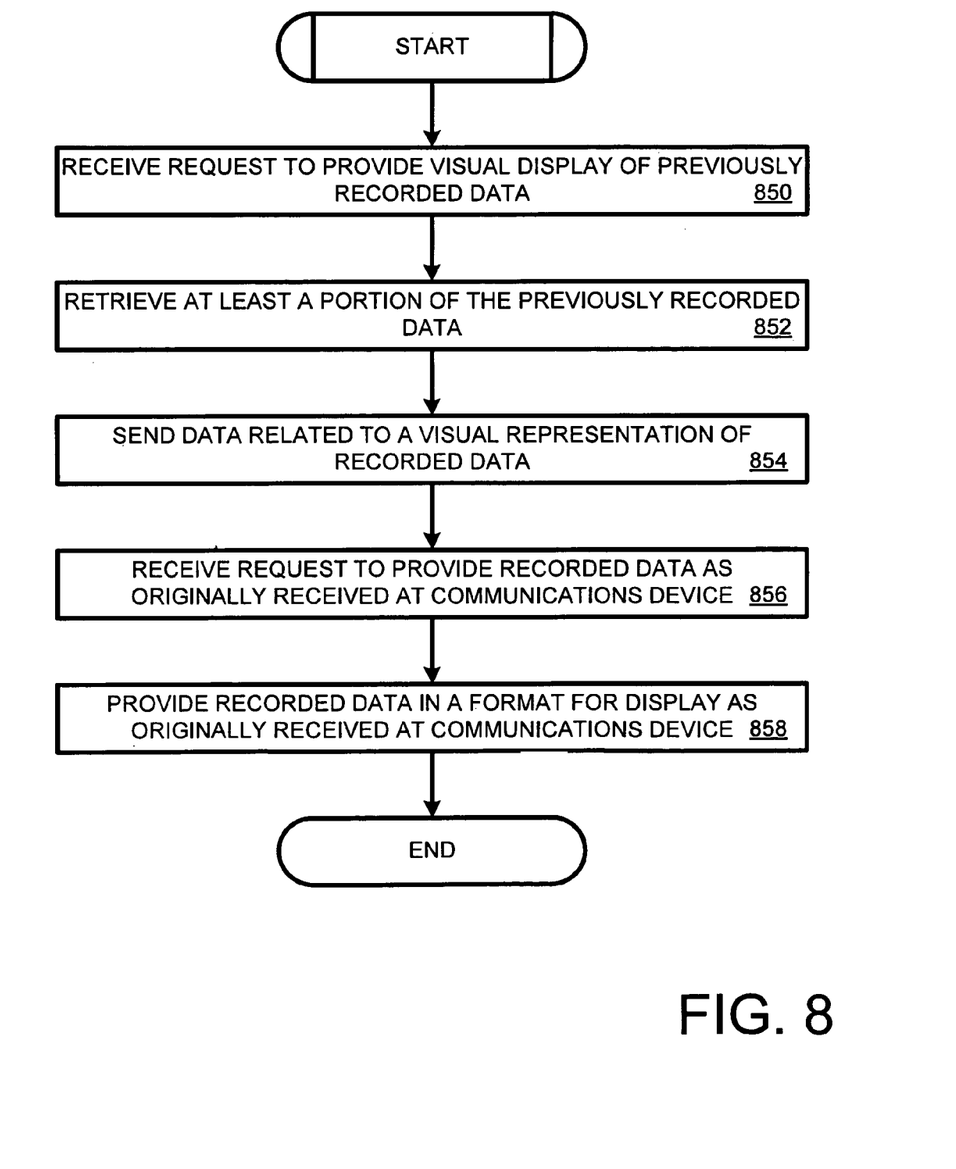
FIG. 8 is a diagram of an exemplary embodiment of a process that may be utilized for providing data in a format for display.

FIG. 8 is an exemplary embodiment of a process that may be utilized for providing data in a format for display. As illustrated in the nonlimiting example of FIG. 8, a communications device can receive a request to provide visual display of previously recorded (block 850). The communications device can retrieve at least a portion of the previously recorded data (block 852). The data may be retrieved from a local storage device and/or from a remote device, such as via the Internet. The communications device can send data related to a visual representation of the recorded data to a display device (block 854). The communications device can receive a request to provide the recorded data as originally received at a communications device (block 856). The communications device can provide the recorded data in a format for display as originally received at the communications device (block 858).

One should note that, as with all the flowcharts, while the above description is related to actions of a communications device, this is a nonlimiting example. More specifically, in at least one exemplary embodiment, a server may perform one or more of the actions. Similarly, while the communications device that originally received the communications data may perform one or more of these actions, this is also a nonlimiting example, as other communications devices and/or computing devices may facilitate presentation of recorded data.

Figure 9:
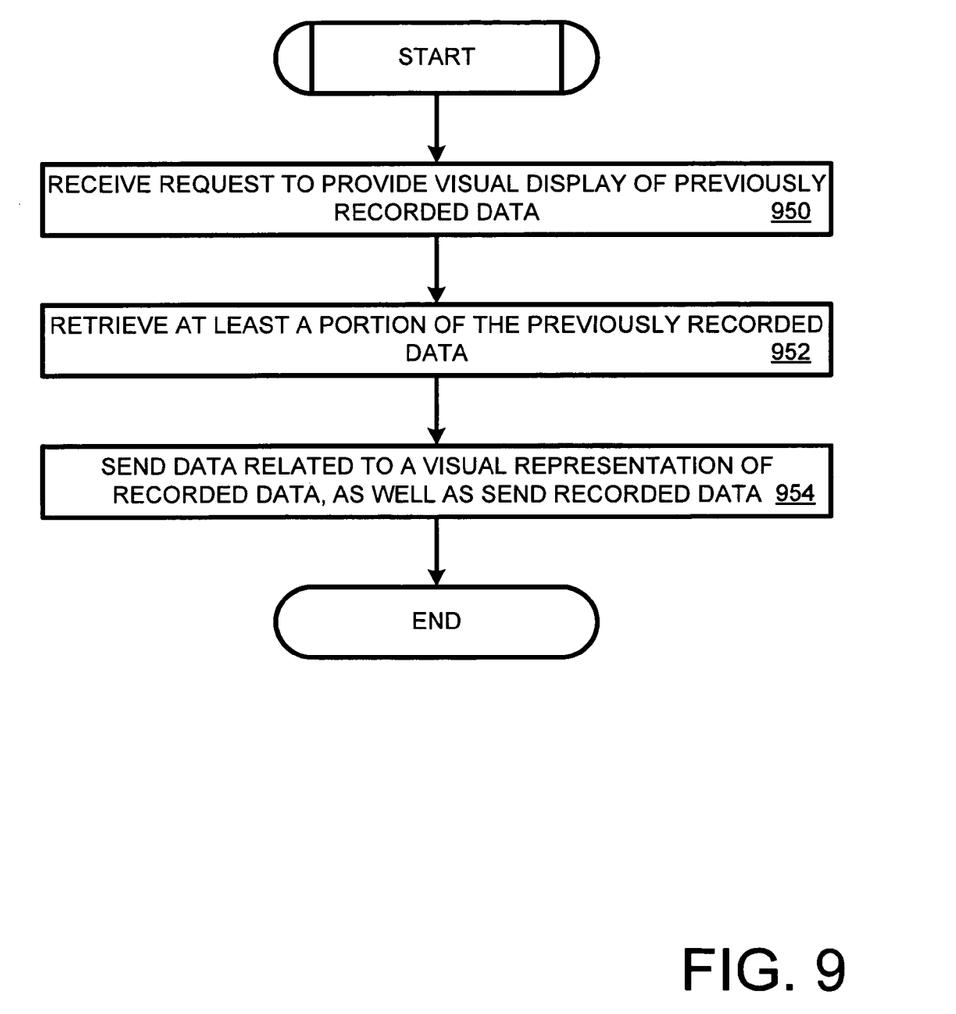
FIG. 9 is a diagram of an exemplary embodiment of a process that may be utilized in sending data related to a visual representation, as well as sending recorded data to a remote device.

FIG. 9 is a diagram of an exemplary embodiment of a process that may be utilized in sending data related to a visual representation, as well as sending recorded data to a remote device. As illustrated in the nonlimiting example of FIG. 9, a communications device may receive a request to provide a display of previously recorded data (block 950). The communications device can retrieve at least a portion of the previously recorded data (block 952). Responsive to the request, the communications device can send data related to a visual representation of recorded data, as well as send the recorded data for display (block 954).

It should be noted that embodiments of one or more of the systems described herein could be used to perform an aspect of speech analytics (i.e., the analysis of recorded speech or real-time speech), which can be used to perform a variety of functions, such as automated call evaluation, call scoring, quality monitoring, quality assessment and compliance/adherence. By way of example, speech analytics can be used to compare a recorded interaction to a script (e.g., a script that the agent was to use during the interaction). In other words, speech analytics can be used to measure how well agents adhere to scripts, identify which agents are "good" sales people and which ones need additional training. As such, speech analytics can be used to find agents who do not adhere to scripts. Yet in another example, speech analytics can measure script effectiveness, identify which scripts are effective and which are not, and find, for example, the section of a script that displeases or upsets customers (e.g., based on emotion detection). As another example, compliance with various policies can be determined. Such may be in the case of, for example, the collections industry where it is a highly regulated business and agents must abide by many rules. The speech analytics of the present disclosure may identify when agents are not adhering to their scripts and guidelines. This can potentially improve collection effectiveness and reduce corporate liability and risk.

In this regard, various types of recording components can be used to facilitate speech analytics. Specifically, such recording components can perform one or more of various functions such as receiving, capturing, intercepting and tapping of data. This can involve the use of active and/or passive recording techniques, as well as the recording of voice and/or screen data.

It should be noted that speech analytics can be used in conjunction with such screen data (e.g., screen data captured from an agent's workstation/PC) for evaluation, scoring, analysis, adherence and compliance purposes, for example. Such integrated functionality can improve the effectiveness and efficiency of, for example, quality assurance programs. For example, the integrated function can help companies to locate appropriate calls (and related screen interactions) for quality monitoring and evaluation. This type of "precision" monitoring improves the effectiveness and productivity of quality assurance programs.

Another aspect that can be accomplished involves fraud detection. In this regard, various manners can be used to determine the identity of a particular speaker. In some embodiments, speech analytics can be used independently and/or in combination with other techniques for performing fraud detection. Specifically, some embodiments can involve identification of a speaker (e.g., a customer) and correlating this identification with other information to determine whether a fraudulent claim for example is being made. If such potential fraud is identified, some embodiments can provide an alert. For example, the speech analytics of the present disclosure may identify the emotions of callers. The identified emotions can be used in conjunction with identifying specific concepts to help companies spot either agents or callers/customers who are involved in fraudulent activities.

Referring back to the collections example outlined above, by using emotion and concept detection, companies can identify which customers are attempting to mislead collectors into believing that they are going to pay. The earlier the company is aware of a problem account, the more recourse options they may have. Thus, the speech analytics of the present disclosure can function as an early warning system to reduce losses.

Additionally, included in this disclosure are embodiments of integrated workforce optimization platforms, as discussed in U.S. patent application Ser. No. 11/359,356, filed on Feb. 22, 2006, entitled "Systems and Methods for Workforce Optimization," U.S. patent application Ser. No. 11/540,185, filed on Sep. 29, 2006, entitled "Systems and Methods for facilitating Contact Center Coaching," and U.S. Patent Application No. 60/909,060, filed on Mar. 30, 2007, entitled "Systems and Methods for Integrating Customer Center Operations Based on Customer Input," all of which are hereby incorporated by reference in their entireties. At least one embodiment of an integrated workforce optimization platform integrates: (1) Quality Monitoring/Call Recording—voice of the customer; the complete customer experience across multimedia touch points; (2) Workforce Management—strategic forecasting and scheduling that drives efficiency and adherence, aids in planning, and helps facilitate optimum staffing and service levels; (3) Performance Management—key performance indicators (KPIs) and scorecards that analyze and help identify synergies, opportunities and improvement areas; (4) e-Learning—training, new information and protocol disseminated to staff, leveraging best practice customer interactions and delivering learning to support development; (5) Analytics—deliver insights from customer interactions to drive business performance; (6) Coaching—feedback to promote efficient performance; and/or (7) Survey—receipt and review of customer feedback and analysis of interactions from customer perspective. By way of example, the integrated workforce optimization process and system can include planning and establishing goals—from both an enterprise and center perspective—to ensure alignment and objectives that complement and support one another. Such planning may be complemented with forecasting and scheduling of the workforce to ensure optimum service levels. Recording and measuring performance may also be utilized, leveraging quality monitoring/call recording to assess service quality and the customer experience. A survey can be provided in order to obtain customer feedback regarding a customer's experience with the customer center.

One should note that the flowcharts included herein show the architecture, functionality, and/or operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions (such as depicted in the flowcharts), can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

It should be emphasized that the above-described embodiments are merely possible examples of implementations, merely set forth for a clear understanding of the principles of this disclosure. Many variations and modifications may be made to the above-described embodiments without departing substantially from the spirit and principles of the disclosure. All such modifications and variations are intended to be included herein within the scope of this disclosure.

The invention claimed is:

1. A method for providing communications data, comprising:
   establishing an interactive communications session between a first part and a second party, at least one of the first party and the second party communicating using a multi-stream communications device;
   receiving data associated with the communications session, the communications session including a first communications stream and a second communications stream received at the multi-stream communications device, wherein the first communications stream and the second communications stream are received in a receiving order;
   recording at least a portion of the communications session;
   receiving a request to provide, from the recorded communications session, at least a portion of the first communications stream in a visual format; and providing at least a portion of the first communications stream in the visual format.

2. The method of claim 1, further comprising:
providing at least a portion of the first communications stream in an audio format, wherein the providing the communications stream in the audio format corresponds with the providing the communications stream in the visual format.

3. The method of claim 1, wherein providing at least a portion of the first communications stream in a visual format includes providing a play all option, the play all option configured to provide at least a portion of the first communications stream and at least a portion of the second communications stream in a visual format in the receiving order.

4. The method of claim 1, wherein the received data includes at least one communications stream of a first type and at least one communications stream of a second type.

5. The method of claim 4, wherein providing at least a portion of the first communications stream in a visual format includes providing a play one type option, wherein the play one type option is configured to facilitate providing a visual representation of at least one of the following: all of the at least one communications stream of the first type and all of the at least one communications stream of the second type.

6. The method of claim 1, wherein the first communications stream includes at least one of the following: voice data, screen data, and text data.

7. The method of claim 1, wherein the visual format includes at least one indicator configured to indicate data activity during the at least a portion of the first communications stream.

8. The method of claim 1, further comprising:
providing at least a portion of the second communications stream in the visual format.

9. A system for providing communications data, comprising:
a first multi-stream communications device that establishes an interactive communications session between a first part and a second party;
a first receiving component configured to receive data associated with the communications session, the communications session including a first communications stream and a second communications stream received at the multi-stream communications device, wherein the first communications stream and the second communications stream are received in a receiving order; and
a first providing component configured to provide a visual representation of the first communications stream.

10. The system of claim 9, further comprising:
a recording component configured to record at least a portion of the received data.

11. The system of claim 9, further comprising:
a second providing component configured to provide a play all option, the play all option configured to provide a visual representation of the first communications stream and the second communications stream in the receiving order.

12. The system of claim 9, wherein the first communications stream is configured according to a first format and the second communications stream is configured according to a second format.

13. The system of claim 12, further comprising:
third providing component configured to provide a play one type option, wherein the play one type option is configured to facilitate providing a visual representation of at least one of the following: all of the at least one communications stream of the first type and all of the at least one communications stream of the second type.

14. The system of claim 9, wherein the first communications stream includes at least one of the following: voice data, screen data, and text data.

15. The system of claim 9, wherein the system is embodied in a computer readable medium.

16. A non-transitory computer readable medium comprising computer-executable instructions that when executed perform a method for providing communications data, comprising:
establishing an interactive communications session between a first part and a second party, at least one of the first party and the second party communicating using a multi-stream communications device;
receiving data associated with the communications session, the communications session including a first communications stream and a second communications stream received at the multi-stream communications device, wherein the first communications stream and the second communications stream are received in a receiving order; and
providing a visual representation of the first communications stream and the second communications stream in the receiving order.

17. The non-transitory computer readable medium of claim 16, further comprising instructions for:
recording at least a portion of the received data.

18. The non-transitory computer readable medium of claim 16, further comprising instructions for:
providing a play all option, to provide a visual representation of all communications streams associated with the received data.

19. The non-transitory computer readable medium of claim 16, wherein the first communications stream is configured according to a first format and the second communications stream is configured according to a second format.

20. The non-transitory computer readable medium of claim 16, further comprising instructions for:
providing a play one type option configured to facilitate play of at least one of the following: all of the at least one communications stream of a first type and all of the at least one communications stream of a second type.

* * * * *